UNITED STATES PATENT OFFICE.

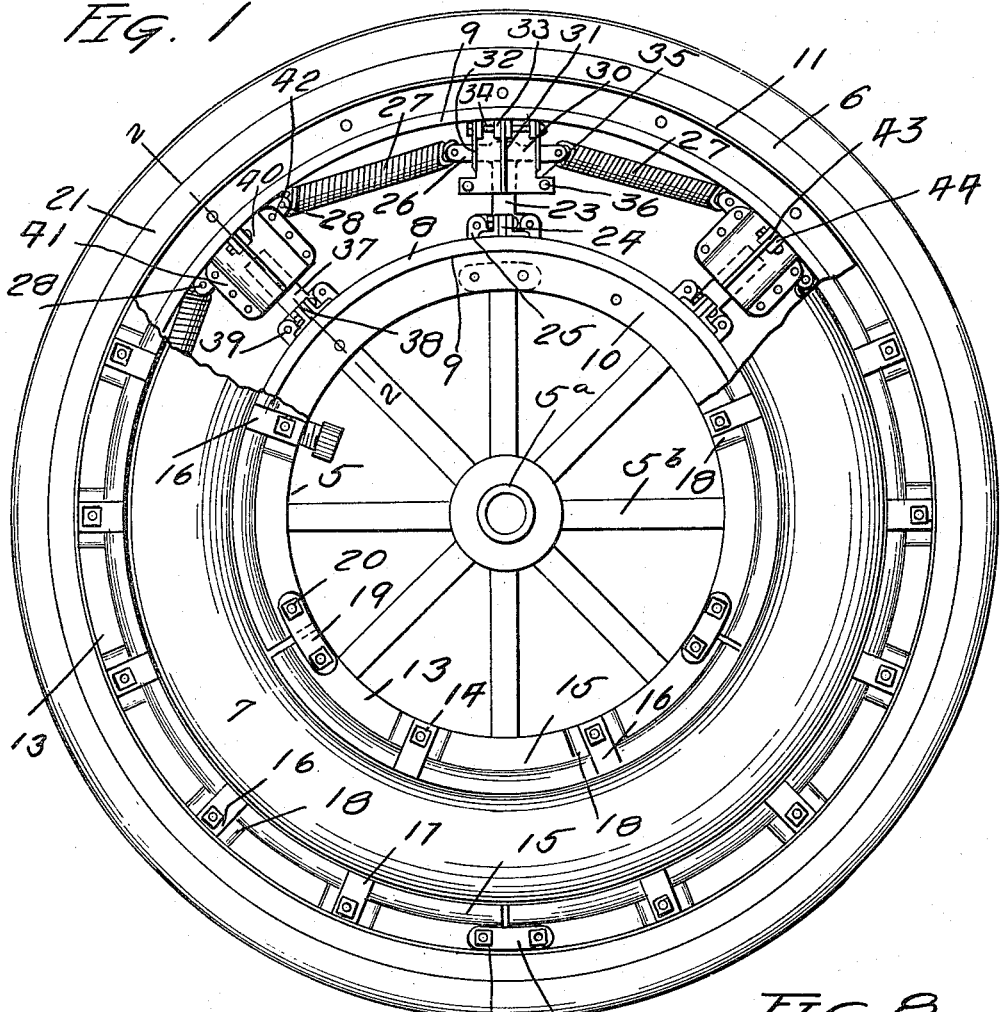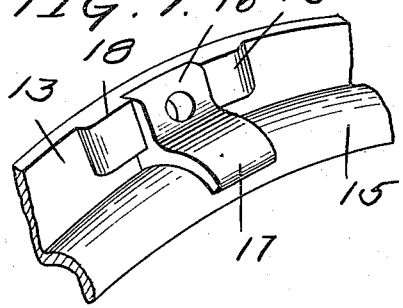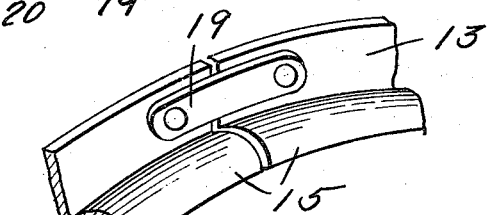

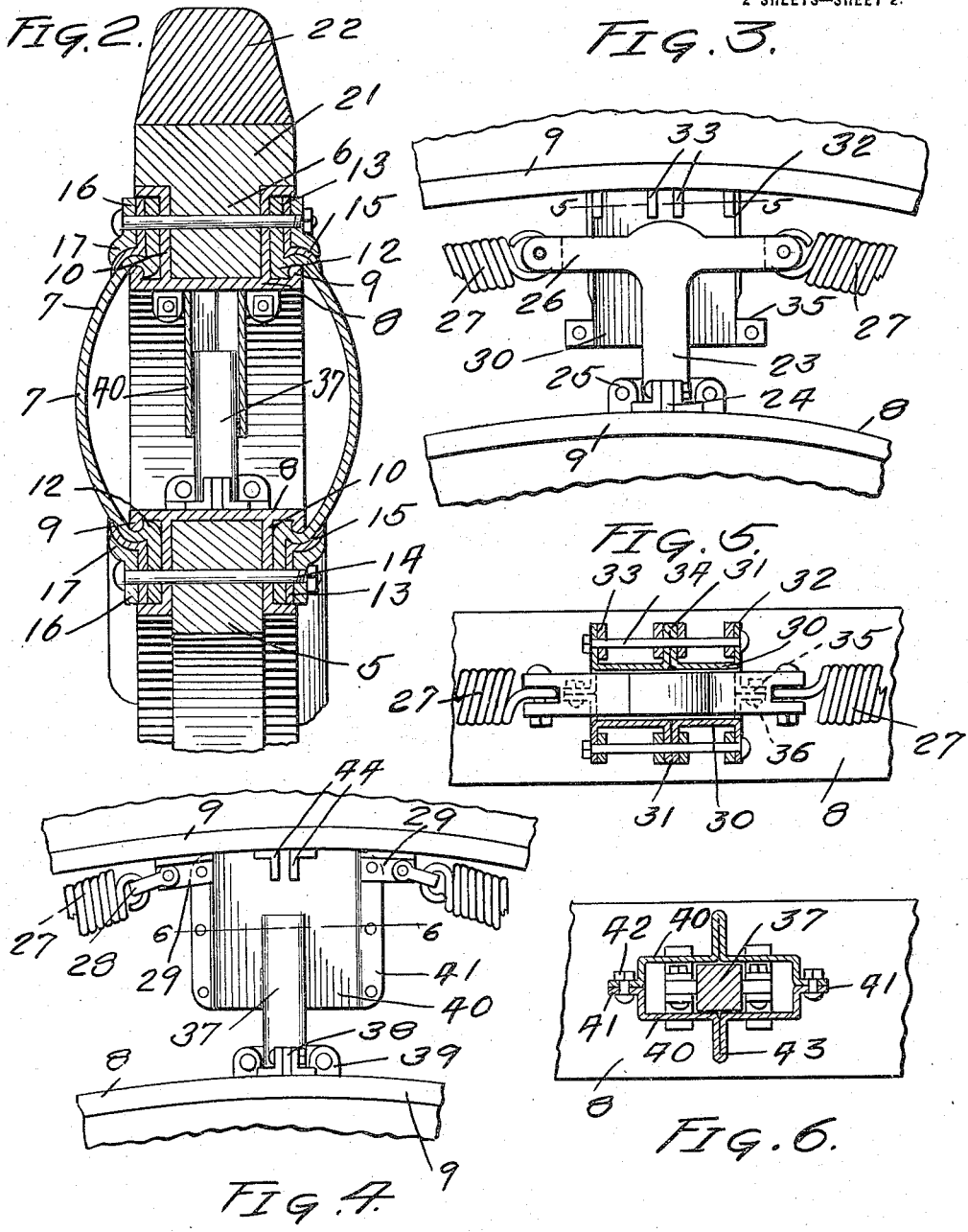

ANDREW P. GIAKOUMIS, OF ELMIRA, NEW YORK.

RESILIENT VEHICLE-WHEEL.

1,163,653.  Specification of Letters Patent.  Patented Dec. 14, 1915.

Application filed June 7, 1915. Serial No. 32,659.

*To all whom it may concern:*

Be it known that I, ANDREW P. GIAKOUMIS, a citizen of the United States, residing at Elmira, in the county of Chemung, State of New York, have invented certain new and useful Improvements in Resilient Vehicle-Wheels; and I do hereby declare the following to be a full, clear, and exact description of the invention, such as will enable others skilled in the art to which it appertains to make and use the same.

This invention relates to new and useful improvements in resilient wheels for automobiles or other vehicles and is particularly directed to the provision of a wheel of that general class which includes both a pneumatic chamber and a metallic spring structure to procure the proper resiliency.

It is primarily the object of the present invention to provide a wheel including a pneumatic tire portion which is so constructed on and adjacent its tread as to obviate the danger of puncturing the tire, and wherein the necessary rigidity and strength of such a tread portion is utilized to incorporate in the wheel certain spring metal means for further resiliently holding the tread portion whereby a maximum degree of resilient action is attained in a vehicle wheel which is not subjected to the usual danger of puncture and which will out-wear the present types of pneumatic wheels.

It is further an object to incorporate the said spring metal means wholly within the pneumatic chamber of the wheel whereby it is fully protected from dust and from other injury and whereby a compact structure is obtained which presents a pleasing appearance.

It is still further an object to provide such a wheel structure wherein the various parts are so formed and arranged as to produce a structure of maximum simplicity and lightness consistent with efficient operation and a proper strength and durability.

With the above and other objects and advantages in view, the invention resides more particularly in the novel combination, formation and arrangement of parts as more fully described hereinafter and pointed out in the appended claims.

Reference is had to the accompanying drawings, wherein similar characters of reference designate corresponding parts throughout the several views, and in which:

Figure 1 is a side elevation of the improved resilient wheel, with a portion of its pneumatic casing broken away to more clearly disclose the interior structure thereof. Fig. 2 is a sectional view cut transversely through the wheel on the line 2—2 of Fig. 1. Fig. 3 is a view longitudinally through a portion of the tire structure of the wheel and showing the securing means for certain adjacent ends of the metallic springs. Fig. 4 is a similar view through a portion of the tire structure and showing the securing means for the other ends of the said springs, it being understood that the structures disclosed in these two views are disposed alternately in the tire. Fig. 5 is a sectional view on the line 5—5 of Fig. 3. Fig. 6 is a sectional view on the line 6—6 of Fig. 4. Fig. 7 is a perspective view of a portion of the clamping band for securing the side portions of the tire, and showing the reinforcing clip for said band. Fig. 8 is a perspective view, showing the means for securing adjacent ends of the bands together.

In carrying out my invention as illustrated in the accompanying drawings, there is provided a wheel rim 5 on which the improved tire structure is secured and this tire structure includes an outer or tread rim 6 and annular side bands 7 which are formed of rubber or like material and which are secured to the rims 5 and 6 to form therewith the pneumatic chamber of the wheel. The means for securing these bands to the rims comprises annular plates 8 disposed on the opposed faces of the rims and having their sides extended outwardly of the rims and provided at their edges with ribs 9 extending toward the respective rim. Flanges 10 are formed on the faces of the plates adjacent the rims and embrace the sides of the rims, the free edges of these flanges being outwardly directed at 11. The side edges of the tire bands 7 are adapted to lie against these flanges 10, and on the inner faces on the sides of this band annular ribs 12 are formed which when the bands are clamped to the flanges 10 extend into channels or grooves formed by the ribs 9 and the inner portions of the flanges 10 and thus serve as a positive means for preventing disengagement of the side bands. The side bands are clamped by annular clamping bands 13 disposed against their side edges and by bolts 14 passing through said bands and the side edges of the tire bands and through the flanges 10 and the tread 5. The adjacent sides of these clamping bands are bent outwardly at 15 to lie against the tire bands adjacent their ribs 12 to positively hold them in place. For reinforcing the clamping bands, plates 16 are carried by the ends of the bolts 14 and are bent at 17 to lie against the bent portions 15 of the bands. These plates are held against displacement, and strain on the bolts is relieved by lugs or projections 18 which are formed on the bands 13 at the sides of said plates. For connecting the ends of the strips of metal forming the bands 13, a plate 19 is secured on said ends as by bolts 20 to hold the ends of the strip in abutting engagement.

By the structure described the tire bands are clampingly held to the inner and outer rims so that a pneumatic chamber is formed which may be filled in the usual manner with air under pressure. The outer or tread rim 6 has its outer peripheral portion enlarged at 21 and carries a tread shoe 22 preferably formed of rubber. Thus the pneumatic chamber is protected from puncture and from wear, as the shoe 22 may be replaced as desired when worn at but little cost as compared to the cost of the usual tire casing. The rim 5 corresponds to the ordinary wheel rim and is connected to the hub 5ª by spokes 5ᵇ.

The metallic spring mechanism which is disposed in the pneumatic chamber for further resiliently supporting the tread portion of the tire includes a series of spaced posts 23 extending radially outward from the plate 8 of the inner rim 5 and secured to said plate by laterally projecting lugs 24 at its end secured between spaced pairs of lugs 25 on said plates. The ends of these spokes terminate adjacent the opposite plate 8 and carry lateral arms 26 which extend in the plane of the wheel and to which are secured the ends of retractile springs 27. The other ends of these springs are secured to clips 28 which are pivotally connected to lugs 29 provided on the plate 8 of the rim 6.

The stiffness imparted to the tire bands 7 by the air pressure within the pneumatic chamber serves chiefly to hold the outer rim structure in proper alinement with the wheel body, but to provide an additional means for holding the outer rim structure in alinement and holding it when the tire is deflated, guide plates 30 are disposed at the sides of the post 23, and each of the plates has its central portion bent in a line axially with respect to the wheel to provide a reinforcing rib 31 and its side edges bent outwardly to provide reinforcing ribs 32. Lugs 33 are provided on the plate 8 of the section 6 adjacent these ribs, and bolts 34 are passed through the adjacent ends of the ribs and through the lugs, whereby the ribs also serve as the attaching means for these guide plates. The inner ends of these plates are held in proper relative position by inwardly off-set lugs 35 at their sides which are secured as by the bolts 36. Posts 37 are provided radially on the plate 8 of the rim 5 between the posts 23, and are similarly secured by lugs 38 secured to lugs 39 on the plate. Guide plates 40 are disposed at the sides of these posts and have their side edges inwardly off-set throughout as at 41 and secured together as by the bolts 42, these side edges being secured to the adjacent pairs of lugs 29 which hold the springs 27, and a stronger structure is here provided than the guide plates 30 which are necessarily open at their sides. The plates 40 are also provided with outwardly bent reinforcing ribs 43 which are secured between pairs of lugs 44 on the plate 8 of the rim 6.

By the structure described, there is provided a relatively simple and compact vehicle wheel which possesses the resilient advantages of a pneumatic wheel, without its disadvantages of liability to puncture and a comparatively short life in operation. By providing the resilient chamber, the outer tread portion is held in proper alinement with the body of the wheel by the pressure of air, and consequently the wear on the guide plates and posts of the metallic spring mechanism is reduced to a minimum, as this guiding or holding means serves really as an emergency means.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. A resilient wheel including concentric spaced rims, flexible annular bands disposed between said rims and secured thereto to form therewith a pneumatic chamber, posts extending radially from the inner rim, guides carried by the outer rim for slidably receiving said posts and retractile springs secured to the sides of each post and to the outer rim.

2. A resilient wheel including concentric spaced rims, flexible annular bands disposed between said rims and secured thereto to form therewith a pneumatic chamber, posts extending radially from the inner rim and terminating short of the outer rim, lateral arms on said posts, retractile springs secured to said arms and to the outer rim, and guide plates carried by the outer rim and disposed at the sides of the posts and arms for slidably receiving the same.

In testimony whereof, I affix my signature, in the presence of two witnesses.

ANDREW P. GIAKOUMIS.

Witnesses:
GEO. H. CHANDLEE,
C. W. FOWLER.

Copies of this patent may be obtained for five cents each, by addressing the "Commissioner of Patents, Washington, D. C."